US005155421A

United States Patent [19]

Hansson

[11] Patent Number: 5,155,421

[45] Date of Patent: Oct. 13, 1992

[54] POWER WRENCH FOR TIGHTENING SCREW JOINTS

[75] Inventor: Gunnar C. Hansson, Stockholm, Sweden

[73] Assignee: Atlas Copco Tools AB, Stockholm, Sweden

[21] Appl. No.: 789,428

[22] Filed: Nov. 5, 1991

Related U.S. Application Data

[63] Continuation of Ser. No. 535,726, Jun. 11, 1990, abandoned.

[30] Foreign Application Priority Data

Jun. 12, 1989 [SE] Sweden ............................... 8902101

[51] Int. Cl.[5] ............................................ H02P 7/00

[52] U.S. Cl. ..................................... 318/434; 81/467

[58] Field of Search ................ 318/434, 432, 280–286, 318/264–266, 272, 275, 367, 369, 462, 465, 467–469, 470, 475, 476, 482; 81/55, 57.11, 57.14, 57.18, 57.22, 467, 469, 477, 429, DIG. 3; 361/23, 31; 388/937

[56] References Cited

U.S. PATENT DOCUMENTS 2,768,546 10/1956 Amtsberg .
2,893,278 7/1959 Rice ..................................... 81/467
3,506,797 4/1970 Ostwald .
3,572,447 3/1971 Pauley et al. ................... 318/432 X
3,926,264 12/1975 Bardwell et al. ............... 318/434 X
4,114,078 9/1978 Malinski et al. ................ 318/434 X
4,222,702 9/1980 Rush .
4,307,784 12/1981 Smith .
4,333,220 6/1982 Aspers ............................. 81/467 X
4,364,111 12/1982 Jocz ............................... 318/286 X
4,463,293 7/1984 Hornung et al. ..................... 318/284
4,813,312 3/1989 Wihelm ................................. 81/467
4,883,130 11/1989 Dixon ............................. 81/467 X
4,906,980 3/1990 Fukuhara .......................... 81/429 X

FOREIGN PATENT DOCUMENTS 277105 8/1988 European Pat. Off. .............. 81/467

*Primary Examiner*—A. Jonathan Wysocki
*Attorney, Agent, or Firm*—Frishauf, Holtz, Goodman & Woodward

[57] ABSTRACT

A power wrench for two-step tightening of screw joints, has a housing (13), an electric motor (10) including a rotor (25), an output shaft (24) coupled to the rotor (25), and a power supply. The power supply includes a power converter (11) with a variable frequency and voltage output and a current responsive power shut-off device. A retardation responsive inertia device (28) is coupled to the motor rotor (25) via a spring (32) and a cam (29, 30) for corotation with the motor rotor (25) and for activation of a switch (12) as a certain predetermined retardation magnitude in the motor rotor (25) is exceeded. The latter is used for obtaining a fast torque interruption of the initial tightening step of the two-step tightening process, whereas the final tightening step is discontinued automatically as a predetermined current magnitude in the power supply is reached.

2 Claims, 3 Drawing Sheets

POWER WRENCH FOR TIGHTENING SCREW JOINTS

This application continuation of application Ser. No. 07/535,726 filed Jun. 11, 1990 now abandoned.

BACKGROUND OF THE INVENTION

This invention relates to a power wrench intended for two-step tightening of screw joints.

In particular the invention concerns a power wrench of the type comprising a housing, an electric motor having a rotor, an output shaft coupled to said motor rotor, and a power supply means including a power converter with a variable frequency and voltage output and a current responsive shut-off means.

In power wrenches of the above type, there is a problem to avoid overtightening of so called stiff joints, i.e. screw joints with a steep torque growth characteristic in relation to angle of turn. By splitting the tightening process into two steps, of which the first step is a preliminary high speed step ending at a torque snug level and the second step is a final low speed high torque step ending at the desired tightening condition, there is avoided that the high speed inertia forces of the rotating parts of the wrench would cause an undesirable augmentation of the intended final torque level.

However, the two-step tightening process in itself, is not a guarantee that the desired final torque level is not exceeded when tightening very stiff joints. In such cases, it is required that even the first step is ended very rapidly to ensure that the inertia forces of the rotating parts of the wrench do not cause any augmented final torque level.

A problem inherent in previously known power wrenches is either that the interruption of the delivered torque is not fast enough and that with these power wrenches a torque overshoot is not avoidable when tightening very stiff joints or that extra wiring communication with the tool is needed for connection of speed sensing means on the tool to the power supply means.

In E.P. 271903 there is described an electrically powered two-step tightening apparatus in which the snug level is detected by a speed sensor mounted in proximity to one of the parts rotated by the motor. This sensor emits pulses as the motor rotates, and the frequency of these pulses is converted to a voltage which is reflective of the rotational speed of the motor. By means of a differential amplifier the derivative of the speed reflecting voltage is formed. A positive derivative indicates an acceleration of the motor speed, and a negative value of the derivative indicates a retardation. After the snug level has been reached, the motor speed is reduced and the tightening is completed at a lower speed.

This known apparatus has a less favourable feature in that the speed sensor arrangement requires extra wiring for communication with the control and power supply unit. This will make hand held tool versions more awkward to handle and more exposed to damage on the part of the wiring and, consequently, the snug level detecting function as well.

A solution to the wiring problem that might seem feasible is to provide a speed sensor in the form of a motor frequency sensitive means incorporated in the power supply unit and to have decelerations of the motor speed calculated. However, this is not a fast enough method to accomplish a snug level signal, because when for example using an asynchronous induction motor, there is a slip between the driving frequency and the motor speed. This slip, which is a sort of "lost motion", would cause an undesirable delay in the frequency change signal and, accordingly, a late interruption of the torque delivery.

For accomplishing a fast reacting power shut-off initiating means intended for interrupting the first, high speed tightening step, the present invention employs a retardation responsive activating means of a type previously used in impact wrenches. See for instance U.S. Pat. No. 2,768,546.

The present invention utilizes a known device including an electric power wrench supplied with power from a power converter with variable voltage and frequency output, and current responsive means are comprised in the power converter to accomplish a power shut-off as a desired final tightening level is reached. This belongs to prior art in itself and is marketed by Atlas Copco, the Assignee of the present application the name: Tensor A-CC-Drive.

SUMMARY OF THE INVENTION

The main object of the invention is to provide an electric power wrench for two-step tightening of screw joints in which a torque overshoot even at very stiff screw joints is safely avoided. The invention comprises a combination of a torque overshoot protective retardation responsive switch means associated with the motor rotor of the tool for initiating interruption of the initial tightening step, and a current responsive power shut-off means associated with the power converter for discontinuing the final tightening step.

Further objects and advantages be apparent from the following detailed description.

DETAILED DESCRIPTION

Figure 1:
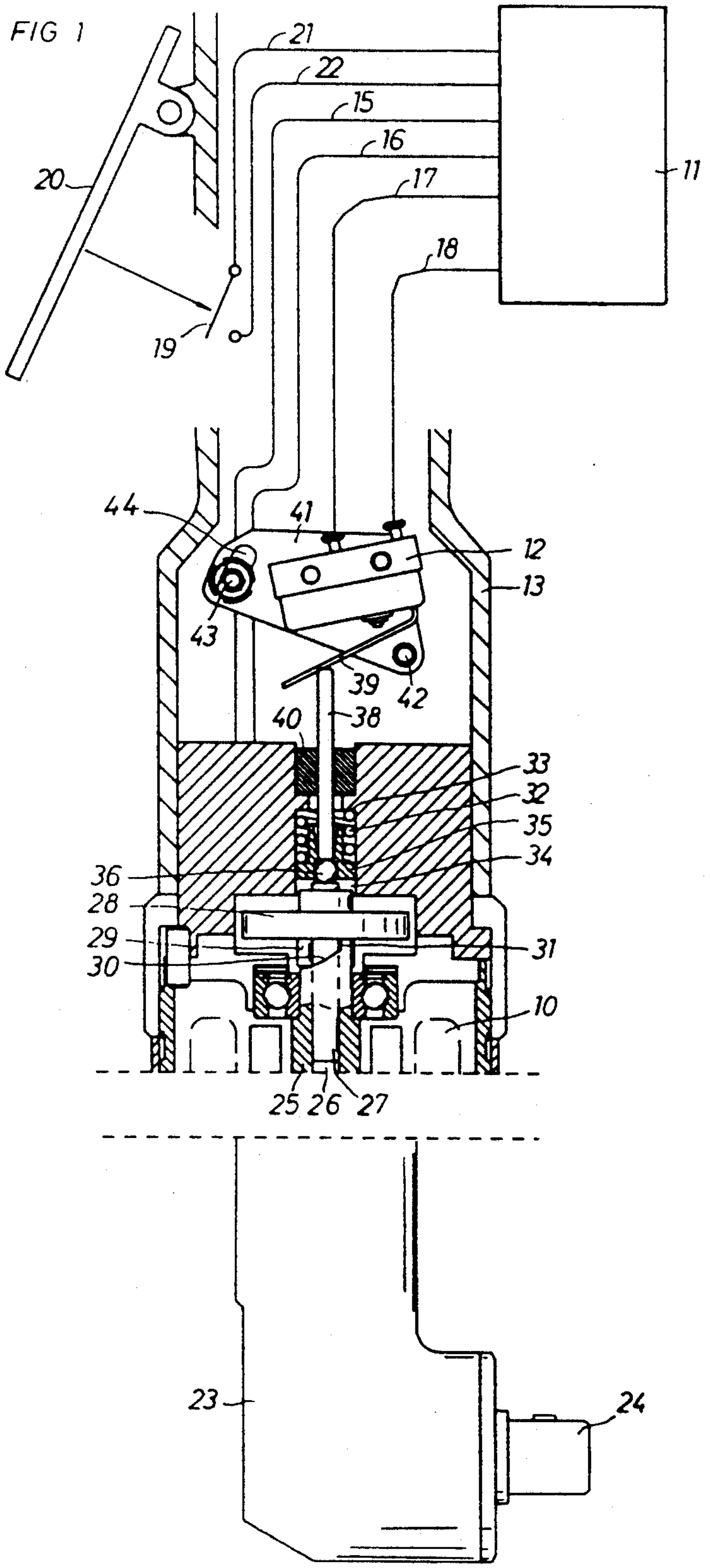
FIG. 1 shows fragmentary view, partly in section, of power wrench according to the invention in a rest or constant speed condition.

The power wrench illustrated in the drawing figures is of the angle nut runner type intended for two-step tightening of threaded joints and powered by an electric AC motor 10. The motor 10, which is of the asynchronous induction type, is supplied with electric power from a control and power supply unit 11. As stated above, the supply unit is of a prior art type known as Tensor A-CC-Drive marketed by Atlas Copco. This control and supply unit power converter comprises a solid state inverter 51 for delivering an AC current of variable frequency and voltage to the motor 10 as well as means for controlling the inverter in response to signals obtained by a current sensing means within the unit 11 and by a switch 12 mounted in the tool housing 13.

The control and power supply unit 11 is located remotely from the tool and communicates with the latter via power supply conduits 15, 16 connected to the motor 10 and signal wires 17, 18 connected to the switch 12. A manually operable switch 19 (just schematically illustrated in the drawing figures) is mounted on the tool housing 13 for operator controlled start of the power supply to the motor 10. The switch 19 is operated by a lever 20 and is connected to the control and power supply unit 11 via wires 21, 22.

Figure 4:
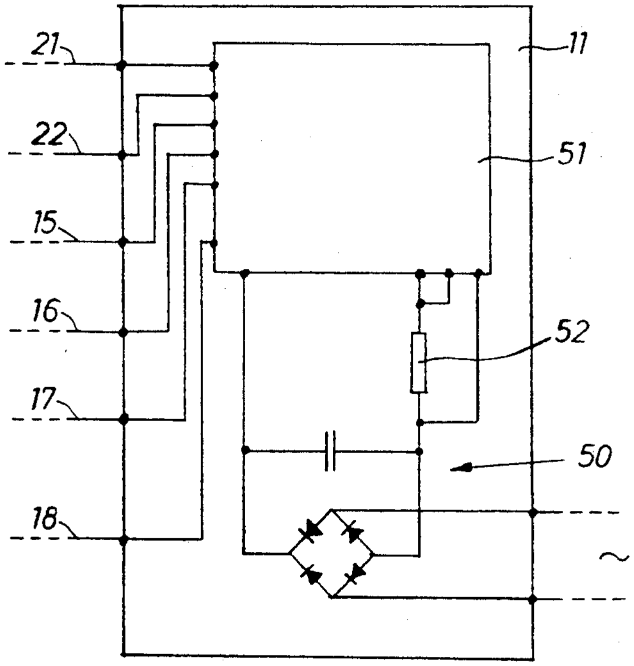
FIG. 4 shows, on a larger scale, details of the control and power supply unit.
Figure 1:
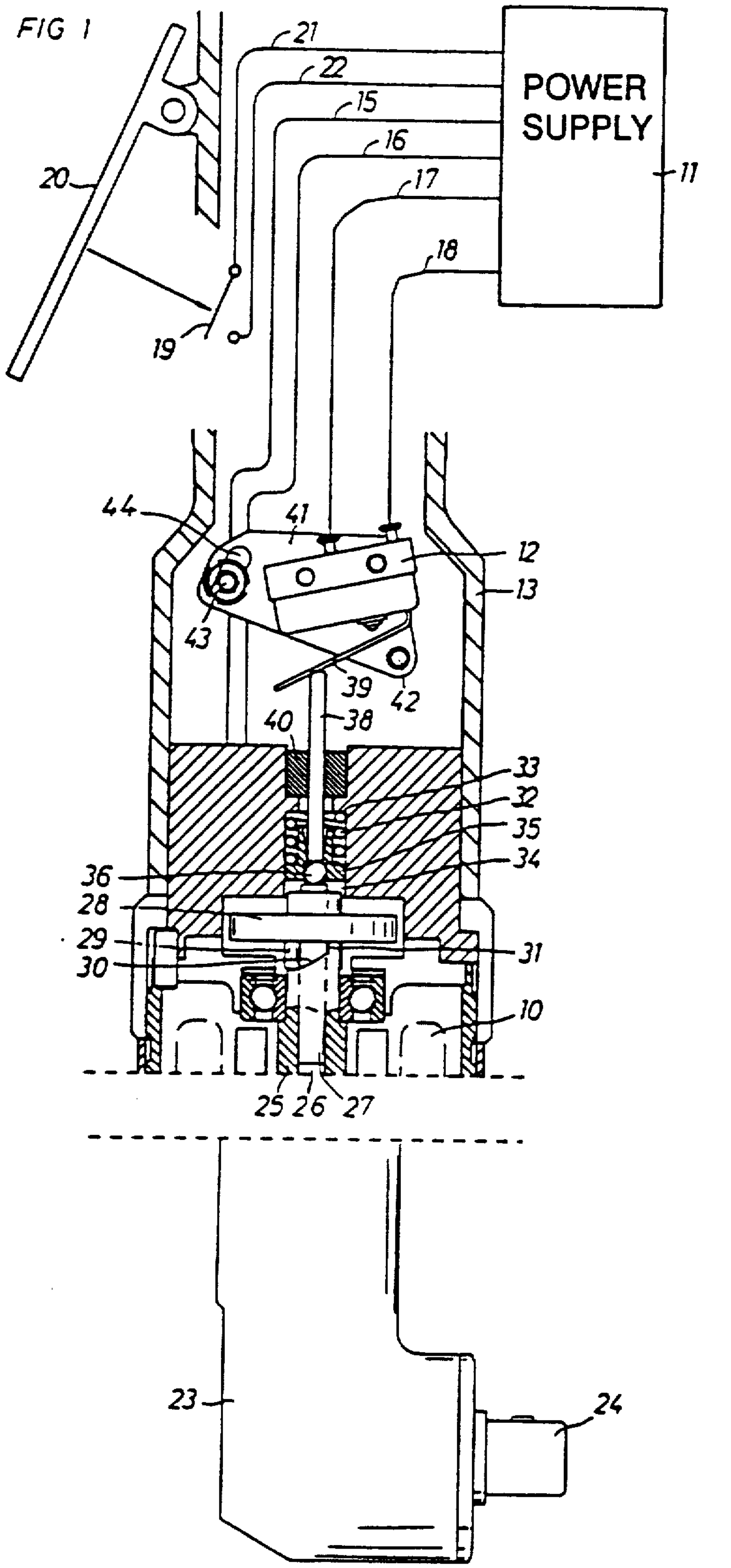
Figure 2:
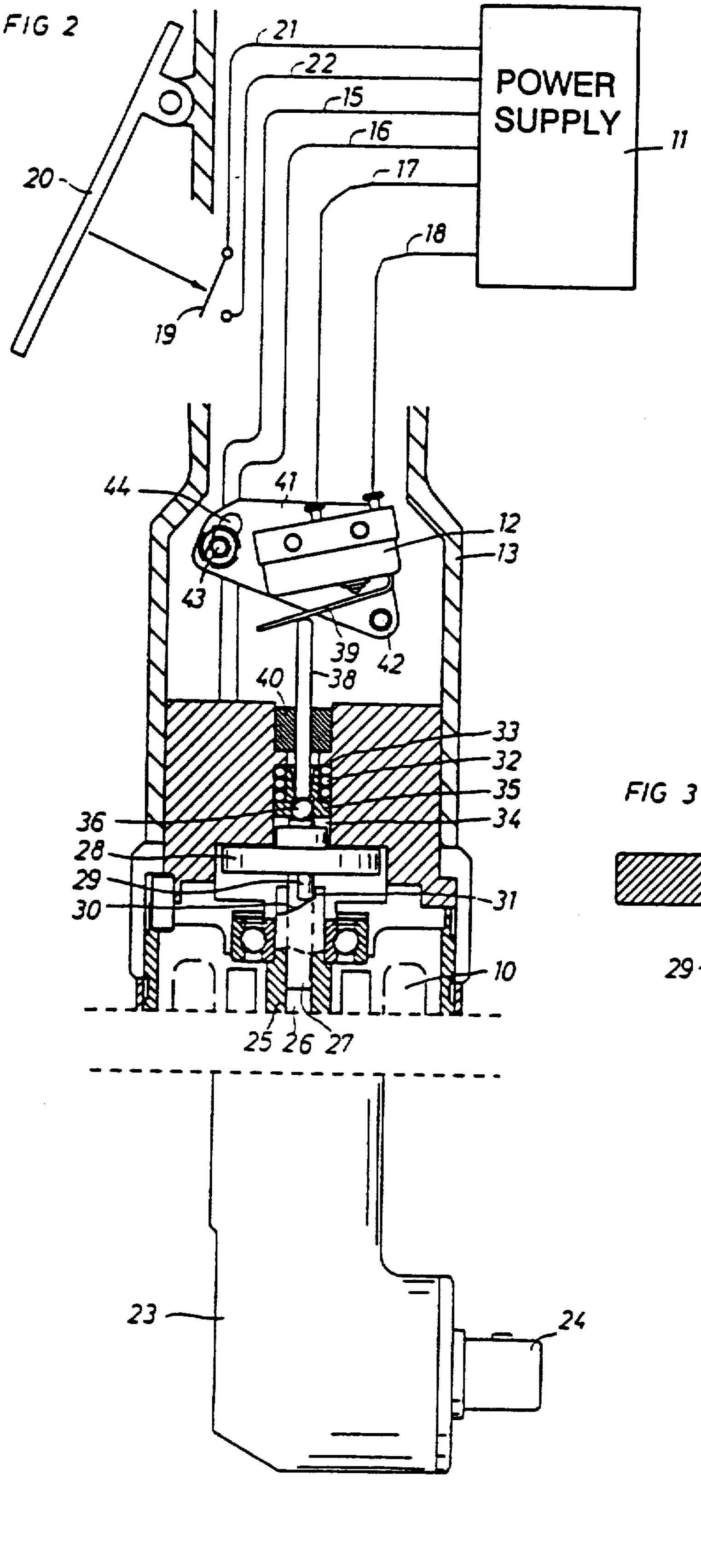
Figure 3:
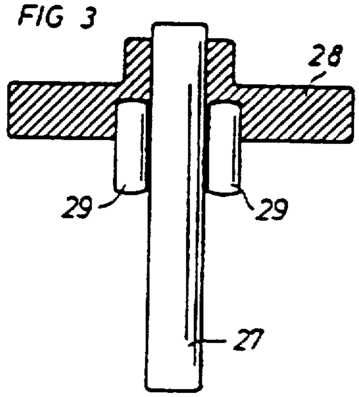
Figure 4:
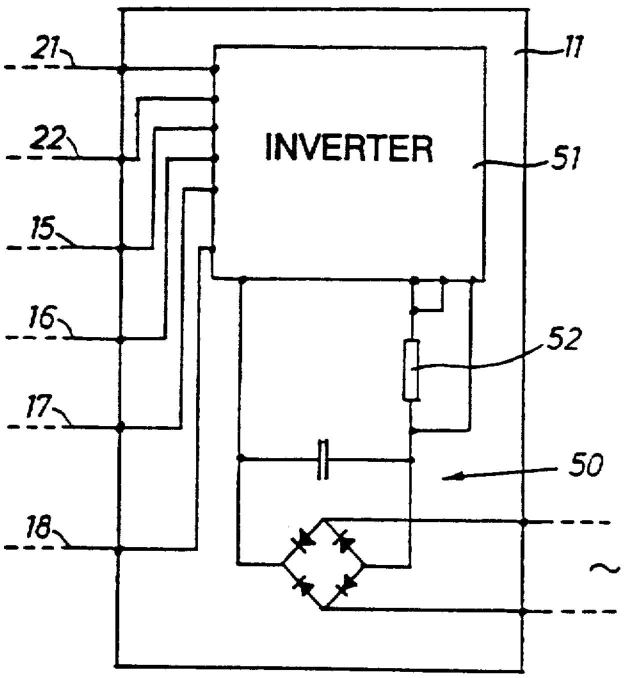

The control and power supply unit 11 is of a previously known type and does not in itself constitute a part of the present invention. Therefore, it is not described in great detail. The main parts of the unit 11, however, as illustrated in FIG. 4, comprise a rectifier 50, which is connected to an external AC power source, and a computerized inverter 51 connected to the rectifier 50 as well as to the power wrench via the conduits 15–18, 21, 22. A low ohmic resistance 52 is provided in the DC section between the rectifier 50 and the inverter 51, and the voltage drop across the resistance 52 is sensed as being indicative of the motor current and, thereby the delivered torque of the motor 10.

Moreover, the power wrench comprises an angle head 23 journalling an output shaft 24 with a square end for connection of a nut socket.

At its rear end, the rotor 25 of the motor 10 is formed with a central coaxial bore 26 in which a spindle 27 is rotatable as well as axially displaceable. On the spindle 27 there is rigidly secured an inertia member in the form of a flywheel 28. In the latter there are rigidly secured two axially extending pins 29 which act as cam followers as they are arranged to engage a pair of cam surfaces 30 on the rear end of the rotor 25. (One only of the cam surfaces 30 is visable in the drawing figures.) Each of the cam surfaces 30 has a top portion 31 with 90 degrees inclination. This portion 31 serves as a stop means to prevent the cam followers 29 from riding over the cam top.

A spring 32 acts between a shoulder 33 in a coaxial bore 34 in the housing 13 and a sleeve 35, thereby exerting an axial bias force on the latter. The sleeve 35, which is displaceably guided in the bore 34 rests via a ball 36 against the centre of the flywheel 28 to, thereby, transfer the axial bias force of the spring 32 to the flywheel 28.

An axially displaceable actuating pin 38 rests with its one end against the ball 36, whereas the opposite end of the pin 38 engages the activation arm 39 of the switch 12. The actuating pin 38 is displaceably guided in a bush 40 mounted in the housing 13.

The switch 12 is secured to a plate 41 which is mounted in the housing 13 by means of a stud 42 and a fixing screw 43. The latter extends through an elongate opening 44 in the plate 41 which provides for a certain adjustability of the switch 12.

In operation, the tool is fitted with a nut socket and is applied on a screw joint to be tightened, while the control and power supply unit 11 connects the tool to a power source. The tightening process is commenced by the operator pressing the lever 20, thereby making the switch 19 deliver a signal to unit 11 which immediately starts supplying a power current to the motor 10 via conduits 15, 16.

During a preliminary tightening or running down step, the torque resistance in the screw joint is very low and the speed of the tool is high. As long as the motor speed is constant or increases, the flywheel 28 and the spindle 27 remain in their forward positions as shown in FIG. 1, biassed by the spring 32 via the sleeve 35 and the ball 36.

As the screw joint is run down and a torque resistance in the screw joint arrises, the rotating parts of the tool, inclusive of the motor rotor 25 start decelerating. This point is called the snug level and indicates where the first or preliminary tightening step shall be ended.

At deceleration of the rotor 25, flywheel 28 tends, due to its inertia, to uphold its rotational speed, whereby a relative rotation between the flywheel 28 and the rotor 25 occurs, since the rotor 25 is decelerating. Then, the cam following pins 29 slide along the cam surfaces 30, thereby accomplishing an axial displacement of the flywheel 28, the spindle 27, the ball 36 and the actuating pin 38. The latter activates the switch 12 which in turn delivers a signal to the control and power supply unit 11 via wires 17, 18.

Due to the provision of the 90° top portions 31 of the cam surfaces 30, there is ensured that the cam following pins 29 do not ride over the cam tops and fall back to engage the next cam surface. At such movements there would be temporary discontinuations of the signal delivered by the switch 12 which would disturb the operation.

Upon receiving a signal from the switch 12, the control unit 11 is programmed to shut off the power supply to the motor in the tightening direction and, instead initiate electrical braking of the motor so as to effectively initiate a brating operation to absorb the remaining kinetic energy of the rotating parts of the prevent the inertia forces of these parts from causing a torque overshoot.

During a following short stand still sequence, the flywheel 28, the spindle 27 and the actuating pin 38 are returned to their original positions by the spring 32. This means that the switch 12 is allowed to resume its inactivated position in which no shut-off and braking signal is delivered to the control unit 11. Instead, the control unit 11 resumes the power supply to the motor 10 to make the tool start the final tightening step in which the screw joint is tightened to a certain desired final torque or pretension level. This torque level corresponds to a certain current magnitude set as a reference value in the inverter 51, and the final tightening step is discontinued automatically as the current level indicated as a voltage drop across the resistance 52 reaches that value.

I claim:

1. A power wrench for two-step tightening of a screw joint, the first step of said two steps comprising an initial tightening to a predetermined torque snug level and the second step of said two steps comprising a final tightening from said predetermined torque snug level to a desired final torque level, said power wrench comprising:

a housing (13);

an electric motor (10) having a rotor (25), and an output shaft (24) drivingly coupled to said rotor (25); and a power supply means (11) including a variable voltage and frequency output power converter for supplying power to said motor;

said power supply means comprising:

a current responsive power shut-off means for interrupting the power supply to said motor (10) at attainment of said final torque level; and a torque overshoot protective retardation responsive switch means (12, 28) associated with said rotor (25) for delivering an electrical shut-off signal to said power converter to stop the supply of power to said motor at attainment of a predetermined retardation magnitude during said first tightening step, said torque overshoot protective retardation responsive switch means being located completely out of contact with the screw joint, a screw joint engaging protruding spindle or a base surface surrounding the screw joint.

2. The power wrench of claim 1, wherein said retardation responsive switch means (12, 28) comprises:

a switch;

an inertia member (28) coaxially disposed relative to said rotor (25); and a cam means (29, 30) drivingly coupling said inertia member (28) to said rotor (25) for providing a switch actuating movement to said switch at a certain retardation magnitude of said rotor (25) for delivering said electrical shut-off signal via said switch.

* * * * *

UNITED STATES PATENT AND TRADEMARK OFFICE

CERTIFICATE OF CORRECTION

PATENT NO. : 5,155,421

DATED : October 13, 1992

INVENTOR(S) : Gunnar C. HANSSON

It is certified that error appears in the above-identified patent and that said Letters Patent is hereby corrected as shown below:

The title page, showing an illustrative figure, should be deleted and substitute therefore the attached title page.

Figure 2:
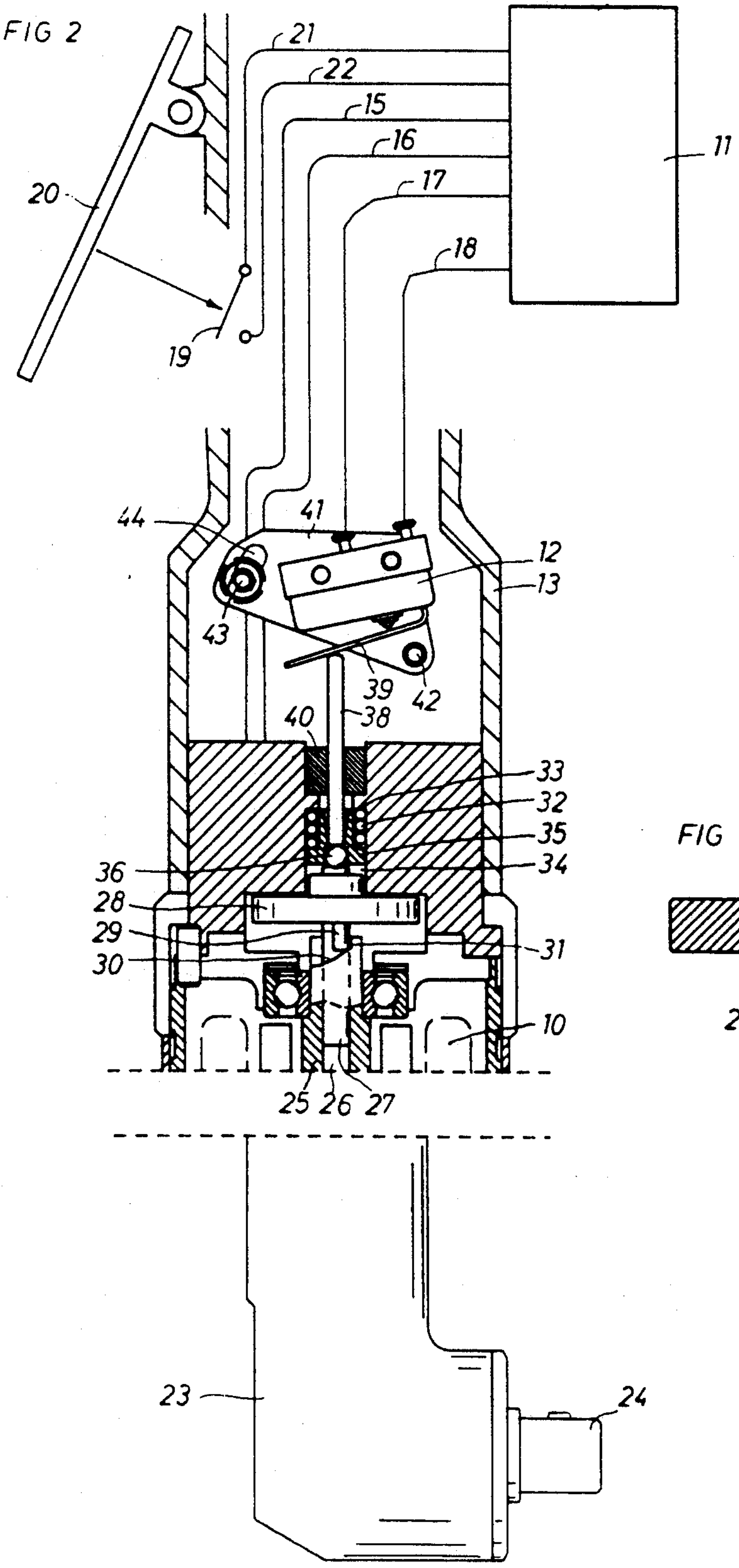
FIG. 2 shows the power wrench of FIG. 1 during retardation.
Figure 3:
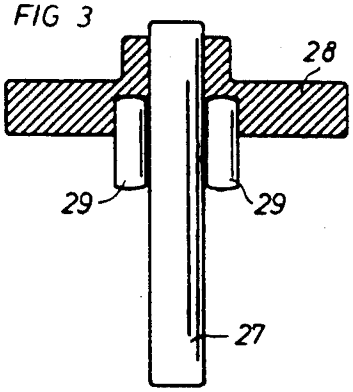
FIG. 3 shows, on a larger scale, the inertia member.

Replace Figures 1, 2 and 4 with the

Figures 1, 2 and 4 attached hereto.

Signed and Sealed this

Twenty-third Day of November, 1993

Attest:

Bruce Lehman

BRUCE LEHMAN

*Attesting Officer* *Commissioner of Patents and Trademarks*

US005155421A

United States Patent [19]

Hansson

[11] Patent Number: 5,155,421

[45] Date of Patent: Oct. 13, 1992

[54] POWER WRENCH FOR TIGHTENING SCREW JOINTS

[75] Inventor: Gunnar C. Hansson, Stockholm, Sweden

[73] Assignee: Atlas Copco Tools AB, Stockholm, Sweden

[21] Appl. No.: 789,428

[22] Filed: Nov. 5, 1991

Related U.S. Application Data

[63] Continuation of Ser. No. 535,726, Jun. 11, 1990, abandoned.

[30] Foreign Application Priority Data

Jun. 12, 1989 [SE] Sweden ............ 8902101

[51] Int. Cl.[5] ............ H02P 7/00

[52] U.S. Cl. ............ 318/434; 81/467

[58] Field of Search ............ 318/434, 432, 280–286, 318/264–266, 272, 275, 367, 369, 462, 465, 467–469, 470, 475, 476, 482; 81/55, 57.11, 57.14, 57.18, 57.22, 467, 469, 477, 429, DIG. 3; 361/23, 31; 388/937

[56] References Cited

U.S. PATENT DOCUMENTS

| | | | |
|---|---|---|---|
| 2,768,546 | 10/1956 | Amtsberg | |
| 2,893,278 | 7/1959 | Rice | 81/467 |
| 3,506,797 | 4/1970 | Ostwald | |
| 3,572,447 | 3/1971 | Pauley et al. | 318/432 X |
| 3,926,264 | 12/1975 | Bardwell et al. | 318/434 X |
| 4,114,078 | 9/1978 | Malinski et al. | 318/434 X |
| 4,222,702 | 9/1980 | Rush | |
| 4,307,784 | 12/1981 | Smith | |
| 4,333,220 | 6/1982 | Aspers | 81/467 X |
| 4,364,111 | 12/1982 | Jocz | 318/286 X |
| 4,463,293 | 7/1984 | Hornung et al. | 318/284 |
| 4,813,312 | 3/1989 | Wihelm | 81/467 |
| 4,883,130 | 11/1989 | Dixon | 81/467 X |
| 4,906,980 | 3/1990 | Fukuhara | 81/429 X |

FOREIGN PATENT DOCUMENTS

| | | | |
|---|---|---|---|
| 277105 | 8/1988 | European Pat. Off. | 81/467 |

*Primary Examiner*—A. Jonathan Wysocki
*Attorney, Agent, or Firm*—Frishauf, Holtz, Goodman & Woodward

[57] ABSTRACT

A power wrench for two-step tightening of screw joints, has a housing (13), an electric motor (10) including a rotor (25), an output shaft (24) coupled to the rotor (25), and a power supply. The power supply includes a power converter (11) with a variable frequency and voltage output and a current responsive power shut-off device. A retardation responsive inertia device (28) is coupled to the motor rotor (25) via a spring (32) and a cam (29, 30) for corotation with the motor rotor (25) and for activation of a switch (12) as a certain predetermined retardation magnitude in the motor rotor (25) is exceeded. The latter is used for obtaining a fast torque interruption of the initial tightening step of the two-step tightening process, whereas the final tightening step is discontinued automatically as a predetermined current magnitude in the power supply is reached.

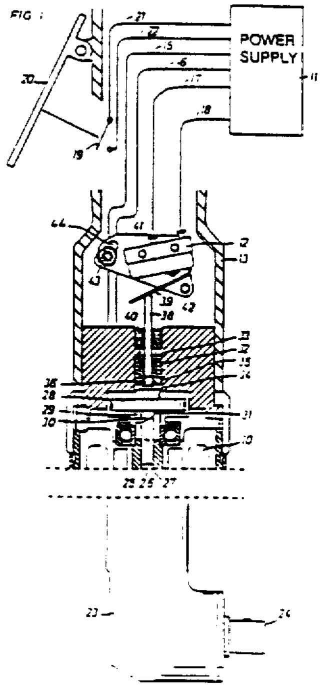

2 Claims, 3 Drawing Sheets